(12) United States Patent
Kyritsis et al.

(10) Patent No.: US 11,815,048 B2
(45) Date of Patent: Nov. 14, 2023

(54) GAS TURBINE ENGINE WITH AIRFLOW MEASUREMENT SYSTEM

(71) Applicant: ROLLS-ROYCE plc, London (GB)

(72) Inventors: Vasileios Kyritsis, Derby (GB); Maurice Bristow, Derby (GB); Peter Loftus, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/398,817

(22) Filed: Aug. 10, 2021

(65) Prior Publication Data

US 2022/0074368 A1 Mar. 10, 2022

(30) Foreign Application Priority Data

Sep. 10, 2020 (GB) ..................................... 2014210

(51) Int. Cl.
*F02K 3/075* (2006.01)
*G01F 1/66* (2022.01)

(52) U.S. Cl.
CPC ................ *F02K 3/075* (2013.01); *G01F 1/66* (2013.01); *F05D 2220/36* (2013.01); *F05D 2260/40311* (2013.01); *F05D 2260/606* (2013.01); *F05D 2270/112* (2013.01); *F05D 2270/303* (2013.01);
(Continued)

(58) Field of Classification Search
CPC .......... F02K 3/075; G01F 1/66; G01F 15/063; G01F 5/00; G01F 15/02; G01F 1/667; F05D 2220/36; F05D 2260/40311; F05D 2260/606; F05D 2270/112; F05D 2270/303; F05D 2270/80; F05D 2210/30; F05D 2250/80; F05D 2270/3061; F05D 2270/806; F01D 17/08; F02C 3/04; G01M 15/14
See application file for complete search history.

(56) References Cited

U.S. PATENT DOCUMENTS

| 3,936,606 A | 2/1976 | Wanke |
| 5,478,199 A | 12/1995 | Gliebe |
| 5,531,124 A | 7/1996 | Kim et al. |

(Continued)

FOREIGN PATENT DOCUMENTS

| CN | 109446187 A | 3/2019 |
| EP | 1517022 A2 | 3/2005 |

(Continued)

OTHER PUBLICATIONS

U.S. Appl. No. 17/017,194, filed Sep. 10, 2020 in the name of Peter Loftus et al.
(Continued)

*Primary Examiner* — Peter J Macchiarolo
*Assistant Examiner* — John M Royston
(74) *Attorney, Agent, or Firm* — Oliff PLC

(57) ABSTRACT

A turbofan gas turbine engine having a bypass duct, and a bypass airflow measurement system. The bypass airflow measurement system comprises: at least one acoustic transmitter configured to transmit an acoustic waveform across the bypass duct of the gas turbine engine though which a bypass airflow passes to at least one acoustic receiver; where the at least one acoustic transmitter and the at least one acoustic receiver are located on an axial plane that is substantially perpendicular to the bypass flow. A method of measuring bypass airflow properties of a turbofan gas turbine engine is also described.

17 Claims, 6 Drawing Sheets

(52) U.S. Cl.
CPC .... *F05D 2270/306* (2013.01); *F05D 2270/80* (2013.01)

(56) References Cited

U.S. PATENT DOCUMENTS

| | | | |
|---|---|---|---|
| 9,556,791 | B2 | 1/2017 | DeSilva et al. |
| 9,746,360 | B2 | 8/2017 | DeSilva et al. |
| 10,281,307 | B2 | 5/2019 | Lowe et al. |
| 2005/0060982 | A1 | 3/2005 | Mani et al. |
| 2008/0175703 | A1 | 7/2008 | Lugg |
| 2008/0181769 | A1 | 7/2008 | Wilson et al. |
| 2009/0078052 | A1 | 3/2009 | Twerdochlib |
| 2009/0178416 | A1* | 7/2009 | Migliaro ............... F02K 3/06 415/13 |
| 2010/0111675 | A1 | 5/2010 | Wojtyczka et al. |
| 2012/0150413 | A1 | 6/2012 | Bunce et al. |
| 2015/0247455 | A1 | 9/2015 | Sheridan |
| 2015/0260557 | A1 | 9/2015 | DeSilva et al. |
| 2015/0308352 | A1* | 10/2015 | Kupratis ............... F02C 7/047 60/726 |
| 2017/0176265 | A1 | 6/2017 | DeSilva et al. |
| 2017/0356773 | A1 | 12/2017 | Lowe et al. |
| 2018/0038282 | A1 | 2/2018 | Kugimiya et al. |
| 2019/0003912 | A1 | 1/2019 | Sato et al. |
| 2019/0293405 | A1 | 9/2019 | Lipstein et al. |
| 2020/0011982 | A1 | 1/2020 | Saripella |
| 2020/0256888 | A1 | 8/2020 | Ell et al. |
| 2020/0393328 | A1 | 12/2020 | Schleif et al. |

FOREIGN PATENT DOCUMENTS

| | | | |
|---|---|---|---|
| EP | 2738372 | A1 | 6/2014 |
| EP | 2887027 | A1 | 6/2015 |
| EP | 3255438 | A1 | 12/2017 |
| EP | 3264104 | A2 | 1/2018 |
| EP | 3543646 | A1 | 9/2019 |
| EP | 3584557 | A1 | 12/2019 |
| GB | 2 207 756 | B | 9/1991 |
| WO | 2016/094144 | A1 | 6/2016 |

OTHER PUBLICATIONS

U.S. Appl. No. 17/017,149, filed Sep. 10, 2020 in the name of Peter Loftus et al.
U.S. Appl. No. 17/017,082, filed Sep. 10, 2020 in the name of Vasileios Kyritsis et al.
Oct. 13, 2021 Office Action issued in U.S. Appl. No. 17/017,082.
Oct. 26, 2021 Extended European Search Report issued in European Patent Application No. 21190488.3.
Oct. 28, 2021 Extended European Search Report issued in European Patent Application No. 21190489.1.
Oct. 29, 2021 Extended European Search Report issued in European Patent Application No. 21190490.9.
Mar. 11, 2022 Office Action issued in U.S. Appl. No. 17/017,149.
Apr. 22, 2022 Office Action issued in U.S. Appl. No. 17/017,082.
Aug. 3, 2022 Office Action Issued In U.S. Appl. No. 17/017,082.
Aug. 3, 2022 Office Action Issued In U.S. Appl. No. 17/017,149.
Oct. 31, 2022 Office Action issued in U.S. Appl. No. 17/017,194.
Nov. 17, 2022 Office Action issued in U.S. Appl. No. 17/017,149.
Feb. 1, 2022 Office Action issued in U.S. Appl. No. 17/017,082.
Dec. 12, 2022 Office Action issued in U.S. Appl. No. 17/017,082.
Feb. 9, 2021 Search Report issued in Great Britain Patent Application No. GB2014210.5.
Feb. 15, 2022 Extended Search Report issued in European Patent Application No. 21190487.5.
Apr. 17, 2023 Notice of Allowance issued in U.S. Appl. No. 17/017,082.
Apr. 25, 2023 Office Action issued in U.S. Appl. No. 17/017,194.
Feb. 14, 2023 Office Action Issued in U.S. Appl. No. 17/017,082.
Feb. 15, 2023 Office Action Issued in U.S. Appl. No. 17/017,149.
Jul. 5, 2023 Notice of Allowance issued In U.S. Appl. No. 17/017,194.
Jun. 2, 2023 Office Action issued in U.S. Appl. No. 17/017,149.
Aug. 10, 2023 Notice of Allowance issued in U.S. Appl. No. 17/017,149.

\* cited by examiner

GAS TURBINE ENGINE WITH AIRFLOW MEASUREMENT SYSTEM

CROSS-REFERENCE TO RELATED APPLICATIONS

This specification is based upon and claims the benefit of priority from United Kingdom patent application number GB 2014210.5 filed on Sep. 10, 2020, the entire contents of which is incorporated herein by reference.

BACKGROUND

Field of the Disclosure

The present disclosure relates to a gas turbine engine that has a bypass airflow measurement system, and a method of measuring bypass airflow within a gas turbine engine.

Description of the Related Art

In an axial flow engine, for example, a gas turbine engine, measurement of the properties of the air flowing into or through the engine can be used to determine the performance of the engine. For example, the average flow velocity or the mass flow of the airflow can be used to calculate the performance and/or efficiency of the engine.

It is currently not possible to directly measure the thrust produced by a gas turbine engine during flight. Therefore, prior to entering into service, gas turbine engines are calibrated to provide a correlation between a measurable parameter, such as rotation speed of one of the core shafts, to a known thrust output. This calibration enables the thrust produced by such an engine to be determined, or at least estimated.

Measurable parameters of gas turbine engine performance that can be correlated to thrust include fan rotating speed and post-fan pressure.

Fan rotating speed is sensitive to fan blade manufacturing scatter and therefore correlating thrust based on that parameter either very tight manufacturing tolerances for engine family trimming at the expense of higher reject rate, or individual engine trimming, if manufacturing tolerances are wide to improve manufacturing yield.

Using post-fan pressure, i.e. the pressure air directly downstream of the fan rotor, as a parameter to be correlated with the thrust produced by a gas turbine engine, has its limitations. Firstly, the pressure range from idle to high power decreases with a reduction in specific thrust/design fan pressure ratio. That applies to both static and stagnation pressure and therefore any absolute error in pressure measurements becomes an increasing fractional error in thrust setting. Secondly, stagnation pressure measurements are characterised by a large sampling uncertainty behind the fan outlet guide vanes (OGVs). This typically required a pressure-based power setting parameter to be set so that the determined thrust is provided for the most pessimistic reading within the uncertainty band. This leads to most engines over-thrusting, which increases the rate with which an engine will deteriorate, reduces the engine's time on wing, and unnecessarily lowers the life of the engine for its owner.

Core-based parameters for correlating thrust are known but the correlation typically is indirect since most of the thrust of gas turbine is generated by the bypass airflow rather than the core airflow. That means that a core-based power setting parameter has to assume a minimum-performing low pressure system, which results in over-thrusting for the majority of engines.

Various methods are known to at least attempt to indirectly measure the thrust produced by a gas turbine engine during flight.

It is known to use Pitot tubes, pitot static tubes, or wall static measurements to measure total and static pressure within air-washed ducts of a gas turbine engine and to use those measurements to derive mass-flow of high volumetric flows in the engine associated with high subsonic Mach numbers. Pitot tubes comprise an aperture configured to face into the oncoming airflow and must substantially protrude/extend into the airflow, for example, to avoid a boundary airflow layer in an inner surface of the casing/ducting surrounding the airflow. The extent to which pitot tubes can extend into the airflow is restricted in order to reduce disruption to the airflow, thus the pitot tubes can only sample the airflow properties in a limited region of the airflow. Sampled measurements made by the pitot tubes in the limited region of the airflow are assumed to have a correlation with the overall (bulk) airflow flowing into/through the engine. However, the correlation must be modelled or estimated to calculate the bulk airflow from the sampled measurements. Furthermore, the samples in the limited region may not be representative of the bulk airflow, for example, it may be influenced by the boundary layer of the airflow along the casing. Therefore, the correlation model may not be robust to a changing operating condition and so the calculation of the bulk airflow may not be accurate.

It is also known to use hot-wire anemometry to measure airflow within a gas turbine engine. A hot-wire anemometer consist of two probes with a wire stretch, typically of tungsten, platinum or platinum-iridium, between them. An electric current is sent through the wire, causing the wire to become hot. As a fluid, e.g. air, flows over the anemometer it cools the wire, dissipating some of its energy. The heating and cooling of the wire can be described by an energy balance equation and that equation can be solved to determine the velocity of the fluid flowing over the wire. While one or more hot-wire anemometers can be installed behind the fan outlet guide vanes of a gas turbine engine to measure airflow within the engine one must accommodate for large uncertainties due to large sampling errors.

It is known to use ultrasonic flow measurement technologies in gas turbine engines although they tend to be applied to pipes, where the flow is of low Mach number, to be practically considered incompressible.

European patent application EP 3255438 A1 discloses a system and method of non-intrusive anemometry. The system comprises an acoustic transmitter disposed at a boundary of fluid flow and first and second acoustic receivers adapted to receive transmissions from the acoustic transmitter. A processor is coupled to the acoustic receivers to determine the time of arrival of the transmission at the acoustic receivers. The acoustic transmitter and acoustic receivers are arranged such that the acoustic transmitter is upstream from the first acoustic receiver which is in turn upstream from the second acoustic receiver. Such a system describes extension of anemometry at high subsonic Mach number flows and assumes no knowledge of local gas stagnation temperature. In particular, the differential timing of receipt of the acoustic signal emitted by the transmitter and received by the two receivers is used as information to solve the system of equations both for average velocity and temperature across the lines of sight connecting the transmitter and receivers.

The present disclosure provides a gas turbine engine that has an improved bypass airflow measurement system from which to correlate the thrust produced by the engine, or at least provides a useful alternative to same.

SUMMARY OF THE DISCLOSURE

According to a first aspect there is provided a turbofan gas turbine engine having a bypass duct and a bypass airflow measurement system, the bypass airflow measurement system comprising: at least one acoustic transmitter configured to transmit an acoustic waveform across the bypass duct of the gas turbine engine though which a bypass airflow passes to at least one acoustic receiver; where the at least one acoustic transmitter and the at least one acoustic receiver are located on an axial plane that is substantially perpendicular to the bypass flow (B).

According to a second aspect there is provided a method of measuring bypass airflow properties of a turbofan gas turbine engine having a bypass duct, the method comprising the steps of: (a) providing at least one acoustic transmitter configured to transmit an acoustic waveform across the bypass duct to at least one acoustic receiver, wherein the at least one acoustic transmitter and the at least one acoustic receiver are located on an axial plane that is substantially perpendicular to the bypass flow; (b) determining a transit time for the wave form travelling from the at least one acoustic transmitter to the at least one acoustic receiver; (c) determining a velocity of bypass airflow from the transit time along each line of sight between each pair of acoustic transmitter and acoustic receiver; (d) calculating an overall average bypass airflow velocity by a weighted sum of the individual airflow velocities derived for each line of sight; and (e) using the average bypass airflow velocity as a constituent element of a power setting parameter for the turbofan gas turbine engine, the power setting parameter being non-dimensionalised relative to a reference temperature.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The term "bypass flow" as used herein means the flow of air through the bypass duct of a turbofan engine during engine operation. It may also be described as the engine bulk flow vector. It is indicated in certain of the accompanying drawings as "B".

The term "substantially perpendicular" as used herein means largely perpendicular but not necessarily exactly perpendicular. For example "substantially perpendicular" includes extending from 80° to 100°, for example 85° to 95°, for example about 90°, for example 90°, with respect to the bypass flow (B).

The term "transit time" for a wave form as used herein means the time taken for a point on a wave form, e.g. an ultrasonic waveform, to travel from an acoustic transmitter to an acoustic receiver along its line of sight.

The term "velocity of bypass airflow" or "bypass airflow velocity" as used herein refers to the velocity of the flowing medium at a specific location within the bypass duct of a turbofan gas turbine engine.

The term "average bypass airflow velocity" as used herein refers to the weighted average of bypass airflow velocities measured at a number of specific locations within the bypass duct of a turbofan gas turbine engine.

The term "power setting parameter" or "PSP" as used herein means a measurable parameter of a gas turbine engine that correlates with the thrust output of the gas turbine engine at a given flight condition. A power setting parameter may, for example, associate thrust of a gas turbine engine with an engine parameter of the gas turbine engine, either measured or derived, such as rotational speed of a shaft driven by a turbine of the engine core and arranged to drive rotation of the fan directly, rotational speed of a shaft driven by a turbine of the engine core and arranged to drive rotation of the fan though a gearbox, rotational speed of a shaft driven by a turbine of the engine core arranged to drive a compressor of the engine core, an air pressure and/or temperature in a bypass and/or core engine station, or a shaft torque measurement of the fan as a function of one or more of altitude, flight speed/Mach number, and/or the ambient temperature, expressed as an absolute figure or in the form of the difference from the ISA temperature.

The term "stagnation pressure/temperature" as used herein is the static pressure/temperature at a stagnation point in a fluid flow. At a stagnation point the fluid velocity is zero and all previous kinetic energy has been isentropically converted into an increase in pressure and temperature relative to its previous static pressure/temperature values.

The term "average static temperature" as used herein refers to the weighted average of static temperature measured at a number of specific radial and/or circumferential positions of a specific engine station. It may be measured at specific points or derived.

The term "passage volumetric flow" as used herein refers to the volume of working medium displaced per unit time through a specified station/planar surface.

The term "engine core" or "core" as used herein means the part of a gas turbine engine that houses the compressor(s), combustor(s), turbine(s), and the core shaft(s) that connect the turbine(s) to the compressor(s). The core is typically contained within an engine nacelle.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limiting example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85.

Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

In FIG. 6 one acoustic transmitter and two acoustic receivers are located on a port ultrasonic sensor plane and one acoustic transmitter and four acoustic receivers are located on a starboard ultrasonic sensor plane. The ultrasonic sensors on the port ultrasonic sensor plane and the ultrasonic sensors on the starboard ultrasonic sensor plane are located on either side of bifurcation walls.

Figure 1:
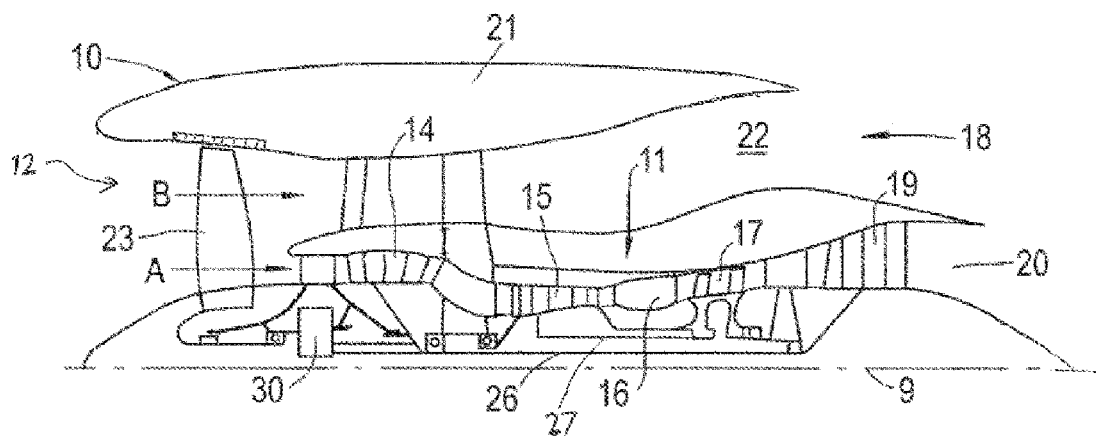
FIG. 1 is a sectional side view of a turbofan gas turbine engine.

The following table lists the reference numerals used in the drawings with the features to which they refer:

| Ref no. | Feature | FIG. |
|---|---|---|
| A | Core airflow | 1 |
| B | Bypass airflow | 1 |
| 9 | Principal and rotational axis (of engine) | 1, 2 |
| 10 | Gas turbine engine | 1 |
| 11 | Core | 1 |
| 12 | Air intake | 1 |
| 14 | Low pressure compressor | 1 |
| 15 | High pressure compressor | 1 |
| 16 | Combustion equipment | 1 |
| 17 | High pressure turbine | 1 |
| 18 | Bypass exhaust nozzle | 1 |

| Ref no. | Feature | FIG. |
|---|---|---|
| 19 | Low pressure turbine | 1 |
| 20 | Core exhaust nozzle | 1 |
| 21 | Fan nacelle or fan case | 1 |
| 22 | Bypass duct | 1 |
| 22a | Outer bypass wall | 4, 6 |
| 22b | Inner bypass wall | 4, 6 |
| 23 | Fan | 1, 2 |
| 23a | Fan case | 7 |
| 24 | Stationary supporting structure | 2 |
| 26 | Shaft | 1, 2 |
| 27 | Interconnecting shaft | 1 |
| 28 | Sun wheel or sun gear | 2, 3 |
| 30 | Epicyclic gear arrangement | 1, 2, 3 |
| 32 | Planet gears | 2, 3 |
| 34 | Planet carrier | 2, 3 |
| 36 | Linkages | 2 |
| 38 | Sun gear | 2, 3 |
| 40 | Linkages | 2 |
| 50 | Acoustic transmitter | 4, 5, 6, 7 |
| 55 | Acoustic receiver | 4, 5, 7, |
| 57 | Line of sight between acoustic transmitter and acoustic receiver | 4, 5, 6, 7 |
| 58 | Bifurcation wall | 6 |
| 58a | Bifurcation wall leading edge | 5, 7 |
| 58b | Bifurcation wall trailing edge | 5, 7 |
| 59 | Outlet guide vane | 5, 7 |
| 60 | Bypass airflow measurement system | 5, 7 |
| 63 | Axial ultrasonic sensor plane | 5, 7 |
| 65 | Acoustic receiver power source | 7 |
| 66 | Acoustic transmitter power source | 5 |
| 68 | Signal processing system | 5, 7 |

DETAILED DESCRIPTION OF THE DISCLOSURE

Aspects and embodiments of the present disclosure will now be discussed with reference to the accompanying figures. Further aspects and embodiments will be apparent to those skilled in the art.

FIG. 1 illustrates a gas turbine engine 10 having a principal rotational axis 9. The engine 10 comprises an air intake 12 which receives air and a propulsive fan 23 generates two airflows: a core airflow A and a bypass airflow B. Air intake airflow comprises the sum total of the air flowing into the operational upstream end of the engine 10, with the sum total of the core airflow A and the bypass airflow B substantially equal to the intake airflow.

The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
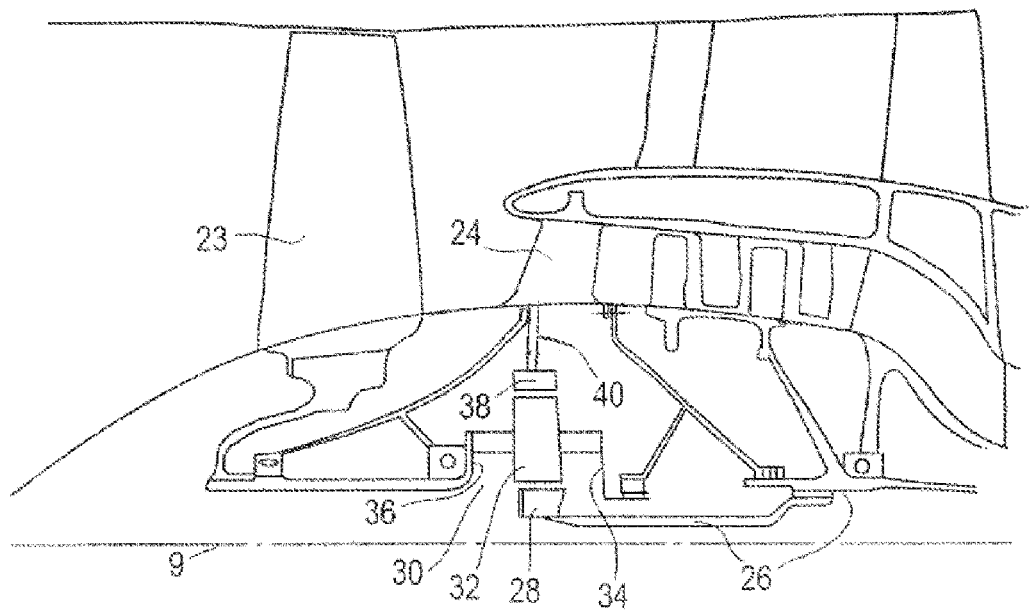
FIG. 2 is a close up sectional side view of an upstream portion of a turbofan gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
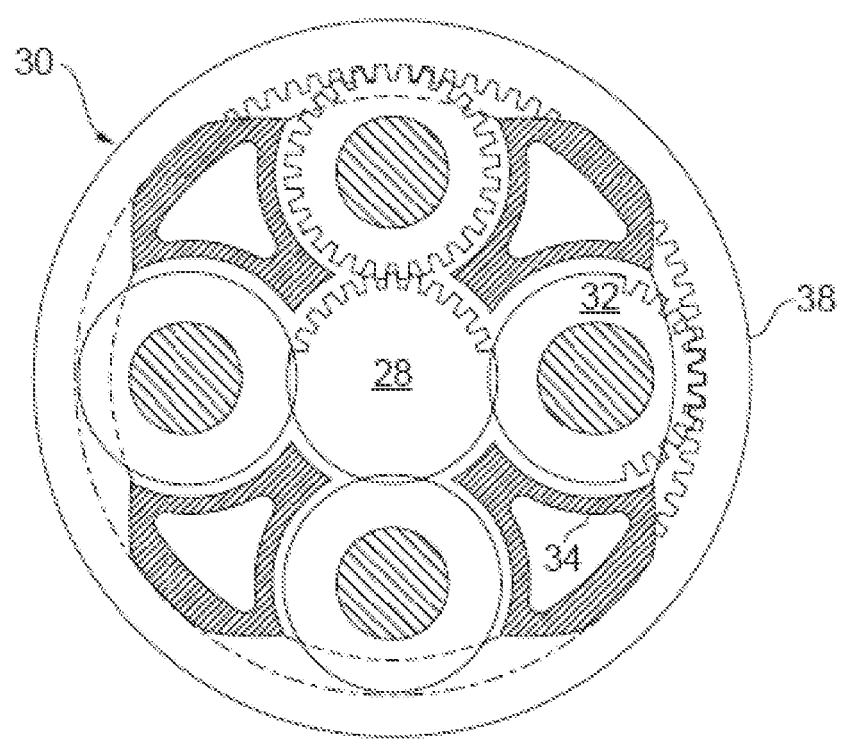
FIG. 3 is a partially cut-away view of a gearbox for a turbofan gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
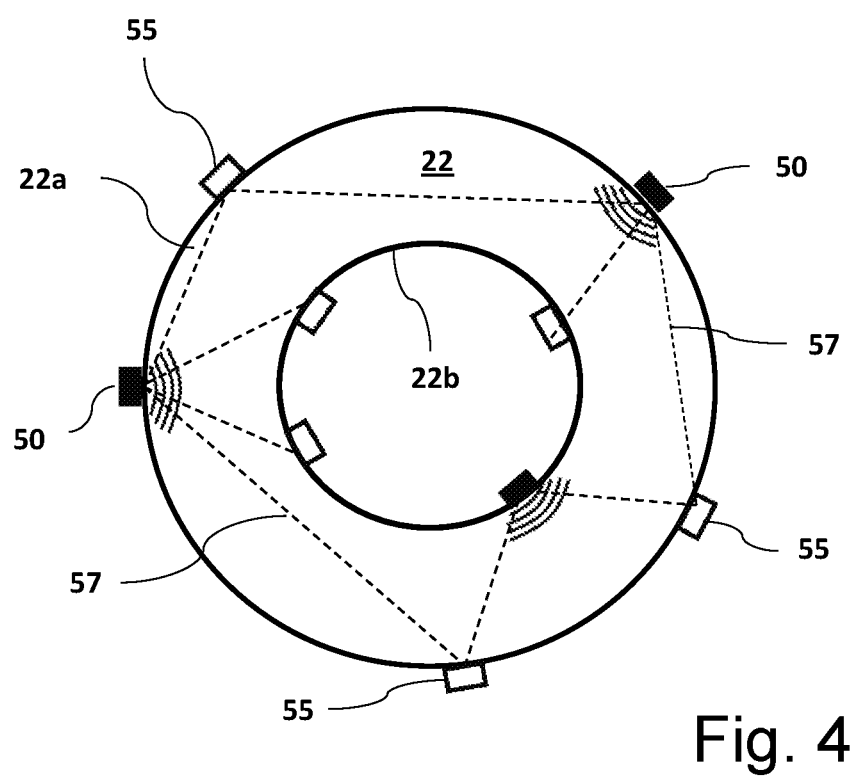
FIG. 4 is a schematic cross-sectional view of a bypass duct of a first embodiment of a turbofan gas turbine engine of the present disclosure equipped with a bypass airflow measurement system that includes multiple ultrasonic sensors, i.e. more specifically three acoustic transmitters and six acoustic receivers. The ultrasonic sensors are located on an ultrasonic sensor plane at an axial position that is substantially perpendicular to the bypass flow (B). There are no bifurcation walls in this location and therefore none of the lines of sight from the acoustic transmitter to the several acoustic receivers is interrupted by a bifurcation wall.
Figure 5:
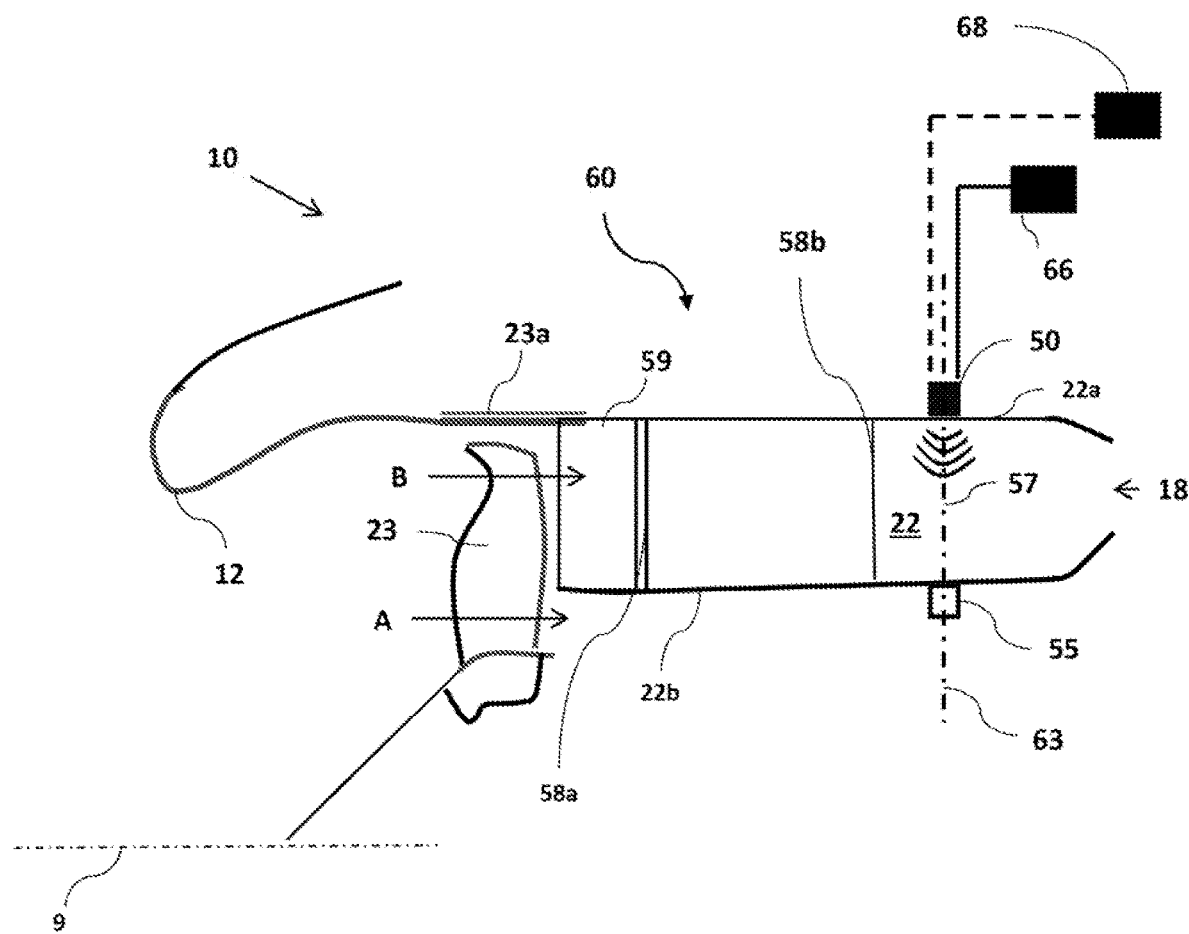
FIG. 5 shows a cross-sectional side view of an air intake and a bypass duct of the first embodiment of a turbofan gas turbine engine of the present disclosure equipped with a bypass airflow measurement system. The bypass airflow measurement system has ultrasonic sensors arranged as shown in FIG. 4 however the cross-sectional side view of FIG. 5 only shows a single acoustic transmitter configured to transmit acoustic waveform across the bypass duct to a single acoustic receiver. The ultrasonic sensors are all located on an ultrasonic sensor plane that is located outside the axial range of any bifurcation walls.

FIGS. 4 and 5 show different views of a first embodiment of a turbofan gas turbine engine of the present disclosure equipped with a bypass airflow measurement system. The bypass airflow measurement system comprises multiple ultrasonic sensors arranged within the bypass duct 22 of a gas turbine engine 10.

FIG. 4 is a schematic cross-sectional view of a bypass duct 22 of a turbofan gas turbine engine 10 viewed down the principal and rotational axis of the engine. The bypass duct 22 is defined by an outer bypass wall 22a and an inner bypass wall 22b. The bypass duct is equipped with multiple ultrasonic sensors, i.e. several acoustic transmitters 50 and several acoustic receivers 55. Two acoustic transmitters 50 are provided on the outer bypass wall 22a and one acoustic transmitter 50 is provided on the inner bypass wall 22b. Three acoustic receivers 55 are provided on the outer bypass wall 22a and three acoustic receivers 55 are provided on the inner bypass wall 22b. The ultrasonic sensors 50, 55 are located on an ultrasonic sensor plane at an axial position along the bypass duct 22 where no bifurcation walls extend. The axial plane is substantially perpendicular to the bypass flow (B). Lines of sight 57 are indicated in FIG. 4 between certain pairs of acoustic transmitters 50 and acoustic receivers 55.

FIG. 5 shows a cross-sectional side view of an air intake, a bypass duct and a bypass exhaust nozzle of the first embodiment of a turbofan gas turbine engine of the present disclosure equipped with a bypass airflow measurement system 60. The bypass airflow measurement system has ultrasonic sensors arranged as shown in FIG. 4 however the cross-sectional side view of FIG. 5 only shows a single acoustic transmitter 50 configured to transmit acoustic waveform across the bypass duct to a single acoustic receiver 55. The ultrasonic sensors are all located on an ultrasonic sensor plane that is located downstream from an outlet guide vane 59 and outside the axial range of any bifurcation walls, more specifically downstream of the bifurcation wall trailing edge 58b.

Each acoustic transmitter 50 is operatively connected to an acoustic transmitter power source 66. Each acoustic receiver 55 is operatively connected to an acoustic receiver power source but that is not shown in the FIG. 5. In the Figure the acoustic transmitter 50 is shown to be operatively connected to the signal processing system 68. Although not shown the acoustic receiver 55 is also operatively connected to the signal processing system 68.

Figure 6:
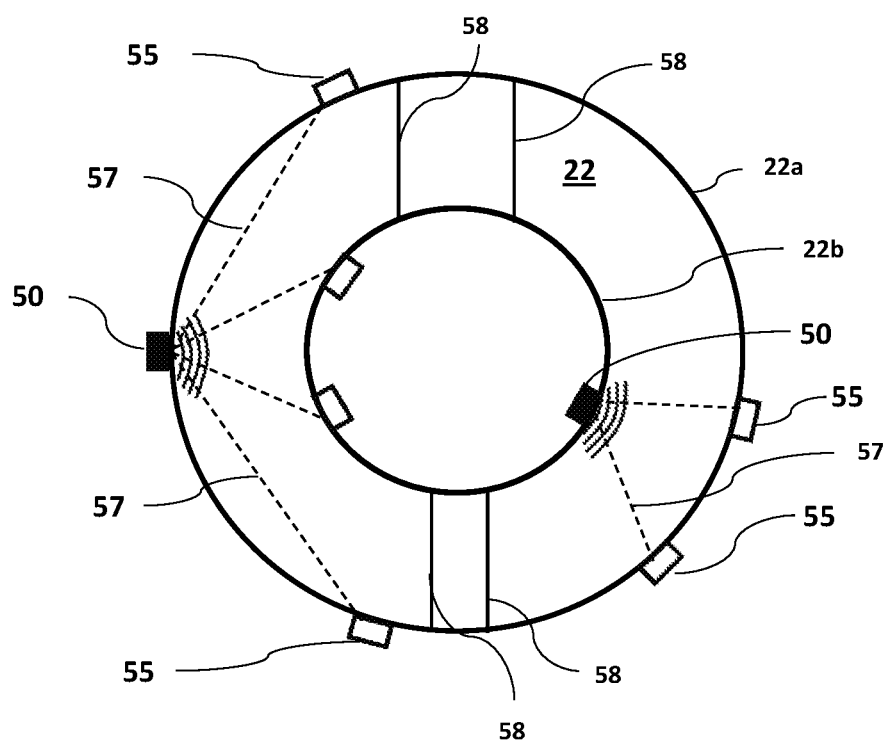
FIG. 6 is a schematic cross-sectional view of a bypass duct of a second embodiment of a turbofan gas turbine engine of the present disclosure equipped with a bypass airflow measurement system that includes multiple ultrasonic sensors, more specifically two acoustic transmitters and several acoustic receivers. The ultrasonic sensors are located on an ultrasonic sensor plane at an axial position that is substantially perpendicular to the bypass flow (B). In an axial flow machine as shown the axial position is substantially perpendicular to the principal and rotational axis of the gas turbine engine. This can separately apply to port and starboard planes. The ultrasonic sensor plane is divided along a vertical plane that passes along the principal and rotational axis of the gas turbine engine into a port ultrasonic sensor plane and a starboard ultrasonic sensor plane.
Figure 7:
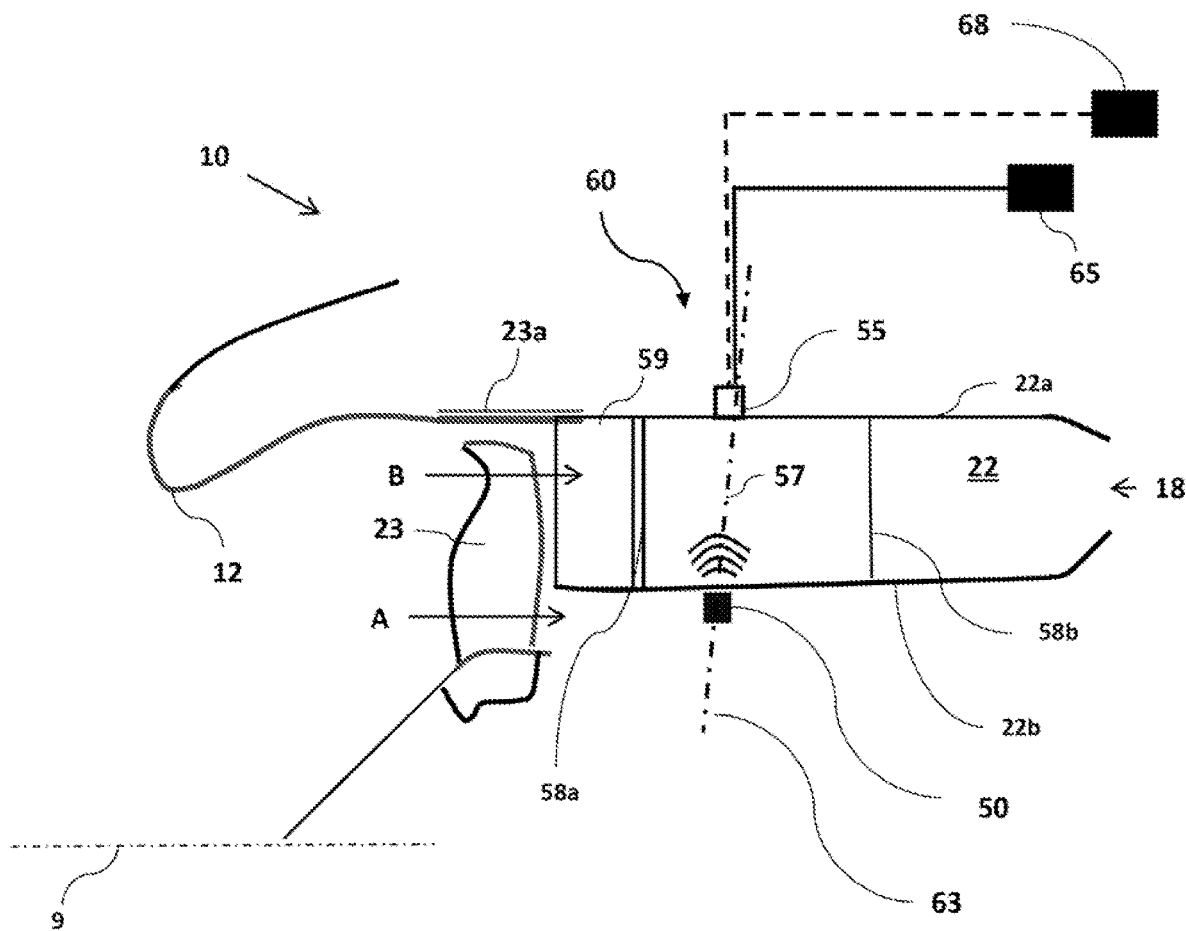
FIG. 7 shows a cross-sectional side view of an air intake and a bypass duct of the second embodiment of a turbofan gas turbine engine of the present disclosure equipped with a bypass airflow measurement system. The bypass airflow measurement system has ultrasonic sensors arranged as shown in FIG. 6 however the cross-sectional side view of FIG. 7 only shows a single acoustic transmitter configured to transmit acoustic waveform across the bypass duct to a single acoustic receiver. The ultrasonic sensors are all located on an ultrasonic sensor plane within the axial range of bifurcation walls. The ultrasonic sensors are located on an ultrasonic sensor plane at an axial position that is substantially perpendicular to the bypass flow (B). In an axial flow machine as shown the axial position is substantially perpendicular to the principal and rotational axis of the gas turbine engine.

FIGS. 6 and 7 show different views of a second embodiment of a turbofan gas turbine engine of the present disclosure equipped with a bypass airflow measurement system.

FIG. 6 is a schematic cross-sectional view of a bypass duct 22 of a gas turbine engine 10 viewed down the principal and rotational axis of the engine. The bypass duct 22 is defined by an outer bypass wall 22a and an inner bypass wall 22b and the bypass duct is equipped with multiple ultrasonic sensors, i.e. several acoustic transmitters 50 and several acoustic receivers 55. The ultrasonic sensors are located at a substantially specific axial position on an ultrasonic sensor plane that is substantially perpendicular to the bypass flow of the gas turbine engine. The port and starboard sensors can be in separate axial positions however the established lines of sight should be on a single plane. In the axial machine shown the ultrasonic sensor plane is divided along a vertical plane that passes along the principal and rotational axis of the gas turbine engine into a port ultrasonic sensor plane and a starboard ultrasonic sensor plane. The port ultrasonic sensor plane and the starboard ultrasonic sensor plane are located on either side of bifurcation walls 58. Some of the acoustic transmitters and acoustic receivers are located on the port ultrasonic sensor plane and the other acoustic transmitters and acoustic receivers are located on the starboard ultrasonic sensor plane. Lines of sight 57 are indicated in FIG. 6 between certain acoustic transmitters 50 and acoustic receivers 55. The arrangement of ultrasonic sensors is such that none of the lines of sight 57 is interrupted by a bifurcation wall.

FIG. 7 shows a cross-sectional side view of an air intake 12 and a bypass duct 22 of the second embodiment of a turbofan gas turbine engine 10 of the present disclosure equipped with a bypass airflow measurement system 60.

The bypass airflow measurement system 60 has at least one acoustic transmitter 50 configured to transmit an acoustic waveform across the bypass duct 22 to at least one acoustic receiver 55. The acoustic transmitter(s) 50 and the acoustic receiver(s) 55 (collectively "ultrasonic sensors" or "sensors") are located on an ultrasonic sensor plane 63. In the first embodiment shown in FIGS. 4 and 5 the ultrasonic sensor plane 63 is not within the axial range of any bifurcation walls. In the second embodiment shown in FIGS. 6 and 7 the ultrasonic sensor plane 63 is within the axial range of bifurcation walls i.e. downstream of the outlet guide vane 59 and downstream a bifurcation wall leading edge 58a and upstream of a bifurcation wall trailing edge 58b.

Having a single acoustic transmitter 50 and the single acoustic receiver 55 can be sufficient for the effective operation of the bypass airflow measurement system 60. It is useful to minimise the numbers of sensors to assist in minimising the weight of the turbofan gas turbine engine and thereby minimising specific fuel consumption and maximising engine efficiency as well as to minimise cost and maintenance. However it can be useful to provide multiple acoustic transmitters and acoustic receiver strategically positioned in and around the bypass duct to provide more representative and accurate measurements of the flow to be sampled and to maximise the robustness of the bypass airflow measurement system to sensor failure. In any event the ultrasonic sensors are located on an ultrasonic sensor plane that is substantially perpendicular to the bypass flow (B).

The acoustic transmitter(s) 50 and the acoustic receiver(s) 55 are located on an axial ultrasonic sensor plane 63 that is substantially perpendicular to the bypass flow (B). In this way the axial ultrasonic sensor plane 63 is substantially orthogonal to net direction of the local bypass airflow. By "substantially perpendicular" is meant largely perpendicular but not necessarily exactly perpendicular. For example in some embodiments the axial ultrasonic sensor plane 63 upon which the acoustic transmitter(s) 50 and the acoustic receiver(s) 55 are located extends from 80° to 100° to the bypass flow (B). In some embodiments the axial ultrasonic sensor plane 63 upon which the acoustic transmitter(s) 50 and the acoustic receiver(s) 55 are located extends from 85° to 95° to the bypass flow (B). In some embodiments the axial ultrasonic sensor plane 63 upon which the acoustic transmitter(s) 50 and the acoustic receiver(s) 55 are located extends about 90° to the bypass flow (B). In some embodiments the axial ultrasonic sensor plane 63 upon which the acoustic transmitter(s) 50 and the acoustic receiver(s) 55 are located extends 90° to the bypass flow (B).

The acoustic transmitter(s) 50 and the acoustic receiver(s) 55 are positioned with a line of sight 57 between them thereby allowing ultrasonic communication in a substantially straight path. Each acoustic transmitter may communicate with one or more acoustic receivers.

The acoustic transmitter(s) 50 and the acoustic receiver(s) 55 are preferably provided in the bypass duct in a manner that avoids or at least minimises any disruption of bypass airflow. This assists the bypass airflow measurement system 60 in providing accurate measurements whilst avoiding or at least minimising any negative impact on local flow aerodynamics, specific fuel performance specifically or engine performance generally. The sensors 50 and 55 may be mounted on, or behind, the outer bypass wall 22a and the inner bypass wall 22b and/or they are mounted flush with same (e.g. so that an edge/side of the sensor is flush with the gas-washed surface of the bypass duct). In other examples, the sensors 50 and 55 may protrude somewhat into the airflow. This may intentionally create turbulence, for example, to facilitate with reattachment of locally separated flow.

The acoustic transmitter(s) 50 and the acoustic receiver(s) 55 are preferably located diametrically opposite each other but need not be so.

Each ultrasonic receiver 55 is configured to receive and detect the ultrasonic waveform transmitted by an ultrasonic transmitter 50.

The sensors 50, 55 are operatively connected to a suitable power source or power sources and a suitable signal processing system 68. In FIG. 5 the acoustic receiver 55 is operatively connected to an acoustic receiver power source 65. The acoustic transmitter 50 is operatively connected to an acoustic transmitter power source but that is not shown in the FIG. 5. In FIG. 7 shows the acoustic receiver 55 is operatively connected to a signal processing system 68. The acoustic receiver 55 may have direct electrical (e.g. wired) connection to the signal processing system 68. The acoustic transmitter 50 is also operatively connected to the signal processing system but that is not shown in the FIG. 7.

The processing system 68 is configured to receive signals from the acoustic receiver(s) 55. It may take various suitable forms. The processing system 68 may, for example, comprise one or more computer processor configured to process the signals from the acoustic receiver(s) 55 to calculate desired flow measurements. In some embodiments, the processing system 68 is configured to provide signals to the acoustic transmitter(s) 50 to begin/end ultrasonic transmission and/or to provide signals to the acoustic receiver(s) 55 to begin/end ultrasonic reception.

The processing system 68 may be in operative communication with a further sensor system (not shown). The further sensor system may provide values of one or more operational parameters (i.e. values of one or more variable operational parameters) required to calculate desired flow measurements.

The processing system 68 may be configured to log the airflow velocity, static temperature and/or the mass flow data over a given period of time. One may also estimate mass flow rate by assuming knowledge of pressure or density, as an extra step. The processing system 68 may analyse the data to provide trends or patterns therein (for example, using regression analysis) according to specific parameters of the engine or engine usage (for example, a particular power or thrust output of the engine or a throttle setting).

The processing system 68 may have an output interface configured to send the data relating to any of the processing inputs or outputs described herein to a further system, such as a monitoring and/or control system for the engine or a subassembly thereof. The further system may be on-board the engine or aircraft, e.g. connected thereto by a data bus or a local wired or wireless network, or else a remote monitoring facility. The output of the processing system 68 could be used: for feedback to a user, e.g. a user interface in an aircraft cockpit; as an input for an operational control system; and/or as an input for an equipment health monitoring system.

Additionally or alternatively, the processing system 68 may comprises non-volatile memory for on-board storage of data.

In some examples, additional conventional measurement devices may be provided to determine the airflow properties in the engine.

Calculation of Average Bypass Flow Velocity and Use as a Power Setting Parameter The turbofan gas turbine engine having a bypass airflow measurement system as described above is useful for sampling volumetric airflow through the engine, more specifically, bypass airflow through the engine.

The present disclosure provides a method of sampling bypass airflow properties of a turbofan gas turbine engine. The method is a non-intrusive anemometric method that involves the use of at least one acoustic transmitter that is configured to transmit an acoustic waveform across the bypass duct of the gas turbine engine to at least one acoustic receiver. The method measures average bypass airflow velocity which can be used as a power setting parameter for the turbofan gas turbine engine e.g. to correlate the thrust produced by the engine.

More specifically the present disclosure provides a method of determining measuring bypass airflow properties of a turbofan gas turbine engine 10 having a bypass duct 22. The method comprises the steps of:
  (a) providing at least one acoustic transmitter 50 configured to transmit an acoustic waveform across the bypass duct 22 to at least one acoustic receiver 55, wherein the at least one acoustic transmitter and the at least one acoustic receiver are located on an axial plane 63 that is substantially perpendicular to the bypass flow B;
  (b) determining a transit time for the wave form travelling from the at least one acoustic transmitter to the at least one acoustic receiver; and
  (c) determining a velocity of bypass airflow B from the transit time along each line-of-sight (57) between each pair of acoustic transmitter 50 and acoustic receiver 55;
  (d) calculating an overall average bypass airflow velocity by a weighted sum of the individual airflow velocities derived for each line-of-sight 57; and
  (e) using the average bypass airflow velocity as a constituent to the power setting parameter for the turbofan gas turbine engine 10, by further non-dimensionalising it relative to a reference temperature.

In step (a) the acoustic transmitter(s) 50 and the acoustic receiver(s) 55 may be arranged as set out in the first aspect of the present disclosure, for example as illustrated in FIG. 5 or 7 of the drawings. Positioning the acoustic transmitter(s) and the acoustic receiver(s) proximate to a boundary of a flowing medium having a velocity, more specifically bypass airflow B, facilitates sampling bypass airflow properties. The acoustic transmitter(s) and the acoustic receiver(s) are typically located at generally opposed locations on or within the bypass duct of the turbofan gas turbine engine. The acoustic transmitter(s) and the acoustic receiver(s) are located on an axial plane 63 that is substantially perpendicular to the bypass flow (B). In some embodiments the axial ultrasonic sensor plane upon which the acoustic transmitter(s) and the acoustic receiver(s) are located extends from 85° to 95° to the bypass flow (B). In some embodiments the axial ultrasonic sensor plane upon which the acoustic transmitter(s) and the acoustic receiver(s) are located extends about 90° to the bypass flow (B). In some embodiments the axial ultrasonic sensor plane 63 upon which the acoustic transmitter(s) 50 and the acoustic receiver(s) 55 are located extends 90° to the bypass flow (B).

In step (b) of the method a transit time for the wave form travelling from the at least one acoustic transmitter to the at least one acoustic receiver is determined. This determination of transit time can made in various ways known in the art. An ultrasonic transmitter 50 transmits an ultrasonic waveform into the airflow. The ultrasonic waveform interacts with the airflow and the speed the waveform travels through the airflow varies according to various physical characteristics of the airflow, as will be described below.

An ultrasonic receiver 55 is located within line of sight 57 of the transmitter. The ultrasonic waveform is received by the ultrasonic receiver 55 and the time between transmitting the ultrasonic waveform and the receiving the waveform is calculated by the signal processing system 68 to provide a measured time-of-flight ($t_{TOF}$).

In step (c) of the method the velocity of bypass airflow B is determined as follows. The phase lag between transmission and receipt of the signal, as described in step (b), is indicative of the time it took the signal to travel from the transmitter to the receiver, travelling with the velocity of sound through the flowing bypass stream along the known distance separating transmitter & receiver. The estimated velocity of sound is proportional to the static temperature of the bulk bypass airflow along that line-of-sight, which can then be estimated. Step (c) may assume knowledge of stagnation temperature, by means of measurement, analytical derivation, or convention.

The flowing medium comprised air, more particularly bypass air, the modelling of which may be approximated as a perfect gas, with the velocity of sound within a gas stream being related to the gas static temperature. Given a distance D of the line of sight between the ultrasonic transmitter 50 and receiver 55 and the measured time-of-flight ($t_{TOF}$) of the acoustic signal, the time-of-flight averaged flow velocity (VTOF) can be calculated as:

$$t_{TOF} = \int \frac{ds}{(\alpha \cdot \vec{n} + \vec{V}_{TOF}) \cdot \vec{k}} \Rightarrow V_{TOF} = \qquad \text{Eq(1)}$$

$$f(\beta, D, t_{TOF}, a) \Rightarrow V_{TOF} = f(\beta, D, t_{TOF}, T_s)$$

given that $a=\sqrt{gRT_s}$ modelling air as a perfect gas.

In a first step 200, equation (1) is used to determine the mean time-of-flight-averaged velocity along the respective line of sight 57 between the acoustic transmitter 50 and acoustic receiver 55. This step is repeated along each line of sight 57 between all of the respective acoustic transmitters 50 and acoustic receivers 55 in plane as required.

Assuming knowledge or making a convention of local stagnation temperature, can result in the average velocity of the bypass flow along that at-least-one examined line of sight 57.

$$h(T_t) - h(T_s) = \frac{V_{thm}^2}{2} \Rightarrow T_s = h^{-1}\left(h(T_t) - \frac{V_{thm}^2}{2}\right) \qquad \text{Eq (2)}$$

$$V_{thm} = C_1 \cdot V_{TOF} \qquad \text{Eq (3)}$$

In equation (3), a weighting correction $C_1$ is applied to the time-of-flight averaged velocity to be converted to the appropriate thermodynamic currency, accounting for the velocity profile at the plane of the ultrasonic sensors; such can be mass-weighted average velocity, although other definitions can be used. The weighting correction $C_1$ can be estimated on the basis of analytical methods or testing.

Where relevant the stagnation temperature may be based on a known estimate by various methods: a) as measured by one or more temperature sensing devices and/or b) by analytical/modelling methods, e.g. derived by preservation of enthalpy on the shaft connecting the fan and the its driving turbine, and/or c) by convention, for example it may be assumed to be equal to the stagnation temperature at engine face, as provided by the aircraft or engine flight data. In the latter case (c) the absolute levels of derived velocity $V_{TOF}$ are not as important, as much as its unique correlation to thrust for a given flight condition.

Equations (1) and (2) are interactively repeated for each of the nodes i.e. for the examined line of sight, until convergence to a tolerance.

In step (d) of the method, the steps taken in (c) are repeated for all possible combinations of lines-of-sight between transmitters and receivers. The corresponding average airflow velocities along those lines-of-sight are weighted to form a single estimate of the overall bypass airflow average velocity.

$$V_{TOF,avg} = \Sigma_i b_i \cdot V_{TOF,i} \qquad \text{Eq (3)}$$

In step (e) of the method, the average bypass airflow velocity may be further corrected for temperature to create a non-dimensional quantity, which may be proportional to the local bypass airflow Mach number and hence form a power setting parameter (PSP) associated to engine corrected thrust.

$$PSP \propto V_{TOF,avg}/\sqrt{gRT_{ref}} \qquad \text{Eq (4)}$$

The reference temperature used in Eq (4) may be based on: a) the average static temperature, as dictated by the transit time of the acoustic signals along known distances for the bypass airflow B, provided by equation (2) after convergence and/or b) a known estimate of stagnation temperature as measured by one or more temperature sensing devices and/or derived through analytical methods/modelling, e.g. preservation of enthalpy on the shaft connecting the fan and the its driving turbine, and/or c) by convention, for example it may be assumed to be equal to the stagnation temperature at engine face, as provided by the aircraft or engine flight data. In the latter case (c) the absolute levels of derived velocity $V_{TOF}$ are not as important, as much as its unique correlation to thrust for a given flight condition. The exact levels of volumetric flow to be targeted for a power setting parameter can be calculated by superposition to higher fidelity estimates and/or measurements of volumetric flow, mass-flow, or pressure ratio, which are indirectly used to estimate thrust or a direct thrust measurement during the pass-off process and/or flight-test.

ADVANTAGES

The turbofan gas turbine engine of the present disclosure that has a bypass airflow measurement system as described above offers various technical advantages. Whilst many of have been described above, in summary such advantages include:

Providing a means to measure the airflow properties of a turbofan gas turbine engine, more particularly the bypass airflow properties, with minimal intrusion into the airflow.

Providing a reduced number of non-intrusive acoustic transmitters and receivers, while still being able to measure average flow properties along the lines of sight, which would otherwise require flow-intrusive measurements if traditional pneumatic sensors were used along that line-of-sight, such as Pitot sensors; hence minimising aerodynamic losses and detrimental effects on engine performance.

Providing, in contrast to known methods, a more direct means of sampling/measuring engine flow that does not rely on making various potentially significant assumptions, e.g. regarding fan rotor capacity, which is affected by manufacturing scatter, and/or nozzle performance, the effective area of which can be affected by changing inlet profiles and/or wing suppression effects.

Providing a method of using mass-flow as a power setting parameter, with the advantage of reduced instrumentation and/or sampling error relative to the increasing mass-flow range of modern low-specific thrust turbofan engines between low and high power. This is in contrast to traditional power setting approaches, whereby bypass pressure readings are characterised by a relative bigger instrumentation and/or sampling error, as pressure ratio range between low and high power decreases with a reduction in specific thrust.

Providing, in contrast to known methods based on ultrasonic anemometry such as the aforementioned EP 3255438 A1 that focusses on making ultrasonic measurements near the nozzle exit of a high speed jet at varying set Mach numbers and assumes no knowledge of stagnation temperature, a method that non-dimensionalises the velocity of the bypass airflow in a manner that can utilise stagnation temperature at engine face to avoiding the use of more complex and/or intrusive measurements at engine internal stations, and can create a useful power setting parameter.

Providing a bypass airflow measurement system with a reduced sensitivity to the aerodynamic qualities of the airflow i.e. the variability in the radial and circumferential profile, the amount of turbulence etc.

Providing a bypass airflow measurement system that is more representative of the average properties of the bypass airflow through a turbofan gas turbine engine.

Providing a single plane of sensors that simplifies installation and maintenance.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A turbofan gas turbine engine having a bypass duct and a bypass airflow measurement system, the bypass airflow measurement system comprising:
at least one acoustic transmitter configured to transmit an acoustic waveform across the bypass duct of the gas turbine engine though which a bypass airflow passes to at least one acoustic receiver, wherein
the at least one acoustic transmitter and the at least one acoustic receiver are located on an axial plane that is substantially perpendicular to the bypass airflow, and
the turbofan gas turbine engine further comprises a bifurcation wall located upstream of the bypass airflow measurement system relative to a direction of the bypass airflow.

2. The turbofan gas turbine engine of claim 1, wherein the axial plane upon which the at least one acoustic transmitter and the at least one acoustic receiver are located extends from 80° to 100° to the bypass airflow.

3. The turbofan gas turbine engine of claim 2, wherein the axial plane upon which the at least one acoustic transmitter and the at least one acoustic receiver are located extends from 85° to 95° to the bypass airflow.

4. The turbofan gas turbine engine of claim 3, wherein the axial plane upon which the at least acoustic transmitter and the at least one acoustic receiver are located extends 90° to the bypass airflow.

5. The turbofan gas turbine engine of claim 1, wherein the at least one acoustic transmitter and the at least one acoustic receiver are mounted in a casing that defines the bypass duct so that they do not substantially protrude into the bypass duct.

6. The turbofan gas turbine engine of claim 1, wherein the bypass airflow measurement system further comprises a signal processing system configured to receive signals from the at least one acoustic receiver and determine a flow rate of the bypass airflow.

7. The turbofan gas turbine engine of claim 6, wherein the signal processing system is configured to determine an average flow velocity of the bypass airflow.

8. The turbofan gas turbine engine of claim 7, wherein the signal processing system is configured to determine one or more of: the mass airflow, and the static temperature.

9. The turbofan gas turbine engine of claim 1, wherein the turbofan gas turbine engine comprises: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft.

10. The turbofan gas turbine engine of claim 9, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

11. A method of measuring bypass airflow properties of a turbofan gas turbine engine having a bypass duct, the method comprising the steps of:
(a) providing at least one acoustic transmitter configured to transmit an acoustic waveform across the bypass duct to at least one acoustic receiver, wherein the at least one acoustic transmitter and the at least one acoustic receiver are located on an axial plane that is substantially perpendicular to the bypass airflow;
(b) determining a transit time for the waveform travelling from the at least one acoustic transmitter to the at least one acoustic receiver;
(c) determining a velocity of bypass airflow from the transit time along each line of sight between the at least one acoustic transmitter and the at least one acoustic receiver;
(d) calculating an overall average bypass airflow velocity by a weighted sum of individual airflow velocities derived for each line of sight; and
(e) using the average bypass airflow velocity as a constituent element of a power setting parameter for the turbofan gas turbine engine, the power setting parameter being non-dimensionalised relative to a reference temperature, wherein
the turbofan gas turbine engine further comprises a bifurcation wall located upstream of the at least one acoustic transmitter and the at least one acoustic receiver relative to a direction of the bypass airflow.

12. The method of claim 11, wherein the axial plane upon which the at least one acoustic transmitter and the at least one acoustic receiver are located extends from 80° to 100° to the bypass airflow.

13. The method of claim 12, wherein the axial plane upon which the at least one acoustic transmitter and the at least one acoustic receiver are located extends from 85° to 95° to the bypass airflow.

14. The method of claim 13, wherein the axial plane upon which the at least one acoustic transmitter and the at least one acoustic receiver are located extends about 90° to the bypass airflow.

15. The method of claim 11, wherein the velocity of bypass airflow is determined based on an average static temperature dictated by the transit time and a predetermined stagnation temperature along the line of sight.

16. The method of claim 11, wherein the reference temperature is the stagnation temperature at an engine face of the turbofan gas turbine engine.

17. A turbofan gas turbine engine having a bypass duct and a bypass airflow measurement system, the bypass airflow measurement system comprising:
at least one acoustic transmitter configured to transmit an acoustic waveform across the bypass duct of the gas turbine engine though which a bypass airflow passes to at least one acoustic receiver, wherein
the at least one acoustic transmitter and the at least one acoustic receiver are located on an axial plane that is substantially perpendicular to the bypass airflow, and
the turbofan gas turbine engine further comprises a bifurcation wall, a leading edge of the bifurcation wall being upstream of the axial plane, and a trailing edge of the bifurcation wall being downstream of the axial plane relative to a direction of the bypass airflow.

* * * * *